United States Patent
Ishikawa et al.

(10) Patent No.: US 12,521,679 B2
(45) Date of Patent: Jan. 13, 2026

(54) FLAT MEMBRANE ELEMENT AND METHOD FOR PRODUCING SAME

(71) Applicant: KUBOTA CORPORATION, Osaka (JP)

(72) Inventors: Kimihiro Ishikawa, Amagasaki (JP); Makoto Takahashi, Amagasaki (JP); Kenichi Tagawa, Amagasaki (JP)

(73) Assignee: KUBOTA CORPORATION, Osaka (JP)

(*) Notice: Subject to any disclaimer, the term of this patent is extended or adjusted under 35 U.S.C. 154(b) by 1370 days.

(21) Appl. No.: 16/765,890

(22) PCT Filed: Nov. 20, 2018

(86) PCT No.: PCT/JP2018/042881
§ 371 (c)(1),
(2) Date: May 21, 2020

(87) PCT Pub. No.: WO2019/111699
PCT Pub. Date: Jun. 13, 2019

(65) Prior Publication Data
US 2020/0353418 A1    Nov. 12, 2020

(30) Foreign Application Priority Data
Dec. 4, 2017   (JP) ................ 2017-232220

(51) Int. Cl.
*B01D 63/08*     (2006.01)
*B01D 69/06*     (2006.01)
(Continued)

(52) U.S. Cl.
CPC ....... *B01D 63/081* (2013.01); *B01D 63/0821* (2022.08); *B01D 69/06* (2013.01);
(Continued)

(58) Field of Classification Search
CPC .... B01D 63/081; B01D 63/082; B01D 69/06; B01D 2315/06; B01D 2313/04;
(Continued)

(56) References Cited

U.S. PATENT DOCUMENTS 5,076,040 A * 12/1991 Davis ............... B29C 66/8167
                                                    53/374.6
9,452,853 B2 *  9/2016 Doll ................ B29C 66/81435
(Continued)

FOREIGN PATENT DOCUMENTS

CN    101835528 A    9/2010
CN    102173052 A    9/2011
(Continued)

OTHER PUBLICATIONS

Extended European Search Report dated Aug. 25, 2021 from corresponding European Patent Application No. 18886506.7.
(Continued)

*Primary Examiner* — Pranav N Patel
(74) *Attorney, Agent, or Firm* — RENNER, OTTO, BOISSELLE & SKLAR, LLP

(57) ABSTRACT

The outer edge of a filtration membrane is thermally welded to a filter plate by a first thermal welding part. The first thermal welding part includes an outer boundary line disposed inside an outer edge of the filter plate and an inner boundary line disposed inside the outer boundary line. The outer boundary line has a plurality of first projected portions and first recessed portions that are alternately formed. The first projected portion projects toward the outer edge of the filter plate, and the first recessed portion is formed between the first projected portions and retracts in an inward direction A opposite to the outer edge of the filter plate.

13 Claims, 24 Drawing Sheets

(51) Int. Cl.
   *B29C 65/00* (2006.01)
   *B29C 65/18* (2006.01)
   *B29L 31/14* (2006.01)

(52) U.S. Cl.
   CPC .............. *B29C 65/18* (2013.01); *B29C 66/10* (2013.01); *B29C 66/221* (2013.01); *B29C 66/225* (2013.01); *B29C 66/232* (2013.01); *B29C 66/24244* (2013.01); *B01D 2313/04* (2013.01); *B01D 2315/06* (2013.01); *B29L 2031/14* (2013.01)

(58) Field of Classification Search
   CPC ......... B01D 63/08; B29C 65/18; B29C 66/10; B29C 66/221; B29C 66/225; B29C 66/232; B29C 66/24244; B29L 2031/14; C02F 3/1273
   See application file for complete search history.

(56) References Cited

U.S. PATENT DOCUMENTS

| | | | |
|---|---|---|---|
| 2008/0251440 A1* | 10/2008 | Saito | B29C 65/08 210/230 |
| 2010/0258497 A1 | 10/2010 | Morita | |
| 2012/0132596 A1* | 5/2012 | Verhoeven | B01D 63/082 210/500.21 |
| 2017/0239625 A1* | 8/2017 | Ishikawa | B29C 66/232 |

FOREIGN PATENT DOCUMENTS

| | | |
|---|---|---|
| CN | 103285639 A | 9/2013 |
| CN | 104226119 A | 12/2014 |
| CN | 105107385 A | 12/2015 |
| CN | 106163646 A | 11/2016 |
| EP | 1728546 A2 | 12/2006 |
| JP | 2000-279767 A | 10/2000 |
| JP | 2002-011469 A | 1/2002 |
| JP | 2006-007223 A | 1/2006 |
| JP | 2008-073678 A | 4/2008 |
| JP | 2011-101869 A | 5/2011 |
| JP | 2015-192931 A | 11/2015 |
| JP | 2016-168547 A | 9/2016 |

OTHER PUBLICATIONS

Office Action (with English translation) dated Sep. 1, 2021 from corresponding Chinese Patent Application No. 201880070663.7.
International Search Report from corresponding International Patent Application No. PCT/JP2018/042881, dated Feb. 12, 2019.
Office Action (with English-language translation) issued Feb. 18, 2022 in corresponding Taiwanese Patent Appl. No. 107142679.

* cited by examiner

FLAT MEMBRANE ELEMENT AND METHOD FOR PRODUCING SAME

FIELD OF THE INVENTION

The present invention relates to a flat membrane element of a submerged membrane separator used for, for example, a membrane-separation activated sludge process, and a method for producing the same.

BACKGROUND OF THE INVENTION

In the related art, such a flat membrane element includes, for example, a sheet-type filtration membrane 102 bonded to a surface of a filter plate 101 as illustrated in FIGS. 23 and 24. The outer edge of the filtration membrane 102 of such a flat membrane element 103 is thermally welded over the circumference of the surface of the filter plate 101 by a thermal welding part 104. The thermal welding part 104 is formed into square meshes. This provides sealing between the filtration membrane 102 and the filter plate 101 along the outer edge of the filtration membrane 102.

In a method for producing the flat membrane element 103, as illustrated in FIG. 25, the filtration membrane 102 is disposed on the surface of the filter plate 101, and then as illustrated in FIG. 26, a hot projection 111 provided on a hot plate 110 is pressed onto the filter plate 101 from above of the outer edge of the filtration membrane 102. This forms the thermal welding part 104 so as to thermally weld the filtration membrane 102 to the filter plate 101.

As illustrated in FIGS. 25 to 27, the hot projection 111 is shaped like the thermal welding part 104, that is, meshes. Thus, a plurality of recesses 112 (hollows) surrounded by the hot projection 111 are formed on the hot plate 110.

The flat membrane element is illustrated with reference to Japanese Patent Laid-Open No. 2015-192931.

In the configuration of the related art, as illustrated in FIGS. 25 to 27, the hot projection 111 of the heated hot plate 110 comes into contact with the filter plate 101 or the filtration membrane 102 during the production of the flat membrane element 103. This may generate gas or cause burning (hereinafter, referred to as burnt bits) on the resin of the filter plate 101 or the filtration membrane 102.

The hot projection 111 is shaped like meshes and surrounds the recesses 112, so that the generated burnt bits are likely to be retained in the recesses 112 of the hot plate 110. When burnt bits are retained in the recesses 112 of the hot plate 110, the burnt bits in the recesses 112 may stick to the flat membrane element 103 during thermal welding and cause a poor appearance or low waterproofness.

Cleaning of the hot plate 110 may be a solution to the sticking of burnt bits. However, burnt bits in the recesses 112 may be hard to remove in cleaning because the hot projection 111 is shaped like meshes and the recesses 112 are surrounded by the hot projection 111. Thus, cleaning of the hot plate 110 requires a lot of time and effort.

SUMMARY OF THE INVENTION

An object of the present invention is to provide a flat membrane element and a method for producing the same, by which burnt bits are hardly retained on a hot plate and the hot plate is easily cleaned even if burnt bits stick to the hot plate, so that burnt bits are prevented from sticking to the hot plate.

Solution to Problem

A first aspect of a flat membrane element including a sheet-type filtration membrane bonded to a surface of a filter plate made of thermoplastic resin according to the present invention,
 the flat membrane element including a thermal welding part in which the outer edge of the filtration membrane is bonded to the surface of the filter plate by thermal welding,
 wherein the thermal welding part is formed between an outer boundary line inside the outer edge of the filter plate and an inner boundary line inside the outer boundary line and includes a plurality of portions alternately disposed in a consecutive manner with small and large welding areas.

With this configuration, when the flat membrane element is produced, the filtration membrane is disposed on the surface of the filter plate, and then a hot projection provided on a hot plate is pressed onto the filter plate from above of the outer edge of the filtration membrane. Thus, the thermal welding part is formed and the filtration membrane is thermally welded to the filter plate in the thermal welding part.

The hot projection used for producing the flat membrane element is identical in shape to the thermal welding part, unlike the mesh-type projection in the related art. Thus, recesses formed on the hot plate are not surrounded by the hot projection, hardly leaving burnt bits. The hot projection provided on the hot plate is opened in an outward direction. Thus, even if burnt bits stick to the projection, the hot plate is cleaned so as to easily remove burnt bits, thereby preventing burnt bits from sticking to the flat membrane element during thermal welding.

A second aspect of a flat membrane element including a sheet-type filtration membrane bonded to a surface of a filter plate made of thermoplastic resin according to the present invention,
 the flat membrane element including a thermal welding part in which the outer edge of the filtration membrane is bonded to the surface of the filter plate by thermal welding,
 wherein the thermal welding part is formed over an area between an outer boundary line inside the outer edge of the filter plate and an inner boundary line inside the outer boundary line,
 the outer boundary line has a plurality of projected portions and recessed portions that are alternately formed in a consecutive manner,
 the projected portion projects toward the outer edge of the filter plate, and
 the recessed portion is formed between the projected portions and retracts in an inward direction opposite to the outer edge of the filter plate.

With this configuration, when the flat membrane element is produced, the filtration membrane is disposed on the surface of the filter plate, and then a hot projection provided on a hot plate is pressed onto the filter plate from above of the outer edge of the filtration membrane. Thus, the thermal welding part is formed and the filtration membrane is thermally welded to the filter plate in the thermal welding part.

The hot projection used for producing the flat membrane element is identical in shape to the thermal welding part, unlike the mesh-type projection in the related art. Thus, recesses formed on the hot plate are not surrounded by the hot projection and are opened in an outward direction.

Hence, the hot plate is cleaned so as to easily remove burnt bits, thereby preventing burnt bits from sticking to the flat membrane element during thermal welding.

A third aspect of the flat membrane element according to the present invention, wherein the outer edge of the filtration membrane is disposed inside the outer end of the projected portion of the thermal welding part and outside the inner end of the recessed portion of the thermal welding part.

With this configuration, in the production of the flat membrane element, even if the filtration membrane is displaced from the filter plate or a production error appears in the dimensions of the filtration membrane, the thermal welding part provides firm sealing between the filter plate and the filtration membrane as long as the outer edge of the filtration membrane is disposed inside the outer end of the projected portion and outside the inner end of the recessed portion.

A fourth aspect of the flat membrane element according to the present invention, wherein the outer boundary line is wavy.

The hot projection used for producing the flat membrane element is wavy, and identical in shape to the thermal welding part, unlike the mesh-type projection in the related art. Thus, recesses formed on the hot plate are not surrounded by the hot projection, hardly leaving burnt bits. The hot projection provided on the hot plate is opened in the outward direction. Hence, even if burnt bits stick to the projection, the hot plate is cleaned so as to easily remove burnt bits, thereby preventing burnt bits from sticking to the flat membrane element during thermal welding.

A fifth aspect of the flat membrane element according to the present invention,
wherein the inner boundary line has a plurality of projected portions and recessed portions that are alternately formed in a consecutive manner,
the projected portion of the inner boundary line projects in the inward direction opposite to the outer edge of the filter plate, and
the recessed portion of the inner boundary line is formed between the projected portions of the inner boundary line and retracts toward the outer edge of the filter plate.

A sixth aspect of the flat membrane element according to the present invention, wherein the inner boundary line is wavy.

A seventh aspect of the flat membrane element according to the present invention, wherein the inner boundary line is a straight line.

An eighth aspect of the flat membrane element according to the present invention, wherein the outer edge of the filtration membrane is thermally welded to the surface of the filter plate by a first thermal welding part thermally welded to the surface of the filter plate and a second thermal welding part that is different from the first thermal welding part, and The first thermal welding part is disposed between the second thermal welding part and the outer edge of the filter plate.

With this configuration, the outer edge of the filtration membrane is thermally welded to the surface of the filter plate by the first thermal welding part and the second thermal welding part. This can more reliably prevent the outer edge of the filtration membrane from peeling from the surface of the filter plate.

A ninth aspect of the flat membrane element according to the present invention,
wherein the outer boundary line and the inner boundary line of the second thermal welding part are straight lines that are parallel with each other.

A first aspect of a method for producing a flat membrane element according to the present invention in which the outer edge of a sheet-type filtration membrane is bonded to a surface of a filter plate made of thermoplastic resin by a thermal welding part,
the method including:
forming the thermal welding part over an area between an outer boundary line inside the outer edge of the filter plate and an inner boundary line inside the outer boundary line by pressing the outer edge of the filtration membrane with a hot projection of a hot plate in a state in which the filtration membrane is disposed on the surface of the filter plate to bond the filtration membrane to the filter plate,
wherein the outer boundary line has a plurality of projected portions and recessed portions that are alternately formed in a consecutive manner, and
the projected portion projects toward the outer edge of the filter plate while the recessed portion retracts in an inward direction opposite to the outer edge of the filter plate.

With this configuration, the hot projection is identical in shape to the thermal welding part, unlike the mesh-type projection in the related art. Thus, recesses formed on the hot plate are not surrounded by the hot projection, hardly leaving burnt bits. The hot projection provided on the hot plate is opened in an outward direction. Hence, even if burnt bits stick to the projection, the hot plate is cleaned so as to easily remove burnt bits, thereby preventing burnt bits from sticking to the flat membrane element during thermal welding.

A second aspect of the method for producing a flat membrane element according to the present invention, wherein the filtration membrane is bonded to the filter plate while the outer edge of the filtration membrane is disposed inside the outer end of the projected portion of the thermal welding part and outside the inner end of the recessed portion of the thermal welding part.

A third aspect of the method for producing a flat membrane element according to the present invention, wherein the inner boundary line of the thermal welding part is linearly formed.

A fourth aspect of the method for producing a flat membrane element according to the present invention, wherein the hot projection is entirely shaped like a rectangular loop.

A fifth aspect of the method for producing a flat membrane element according to the present invention, wherein the outer edge of the filtration membrane is pressed by a first hot projection and a second hot projection of the hot plate so as to form a first thermal welding part and a second thermal welding part that is different from the first thermal welding part, and the filtration membrane is bonded to the filter plate while the first thermal welding part is disposed between the second thermal welding part and the outer edge of the filter plate.

A sixth aspect of the method for producing a flat membrane element according to the present invention, wherein each of the first hot projection and the second hot projection is entirely shaped like a rectangular loop.

Advantageous Effects of Invention

As has been discussed, the present invention hardly leaves burnt bits on the hot plate. Even if burnt bits stick to the hot plate, the hot plate is cleaned so as to easily remove burnt bits, thereby preventing burnt bits from sticking to the flat membrane element during thermal welding.

DETAILED DESCRIPTION OF THE INVENTION

Embodiments of the present invention will be described below with reference to the accompanying drawings.

First Embodiment

Figure 1:
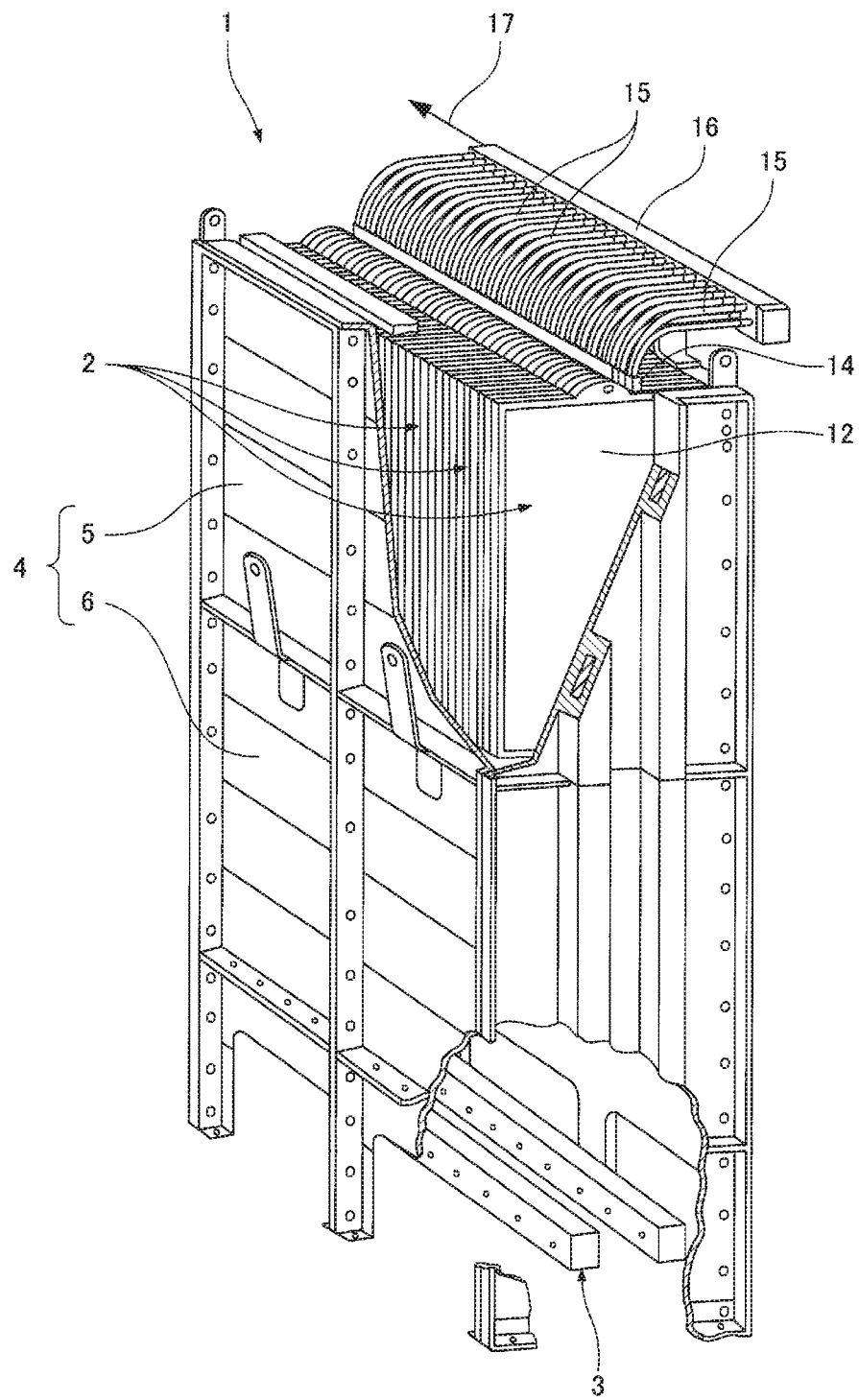
FIG. 1 is a partially-cut perspective view of a membrane separator including a flat membrane element according to a first embodiment of the present invention.

In the first embodiment, as illustrated in FIG. 1, reference numeral 1 denotes a submerged membrane separator used for a membrane-separation activated sludge process. The membrane separator 1 is configured such that a plurality of flat membrane elements 2 and an air diffuser 3 for blowing air from the bottom are provided in a case 4. The case 4 can be separated into an upper membrane case 5 and a lower air diffusion case 6. The flat membrane elements 2 are disposed at predetermined intervals in the membrane case 5. The air diffuser 3 is disposed in the air diffusion case 6.

Figure 2:
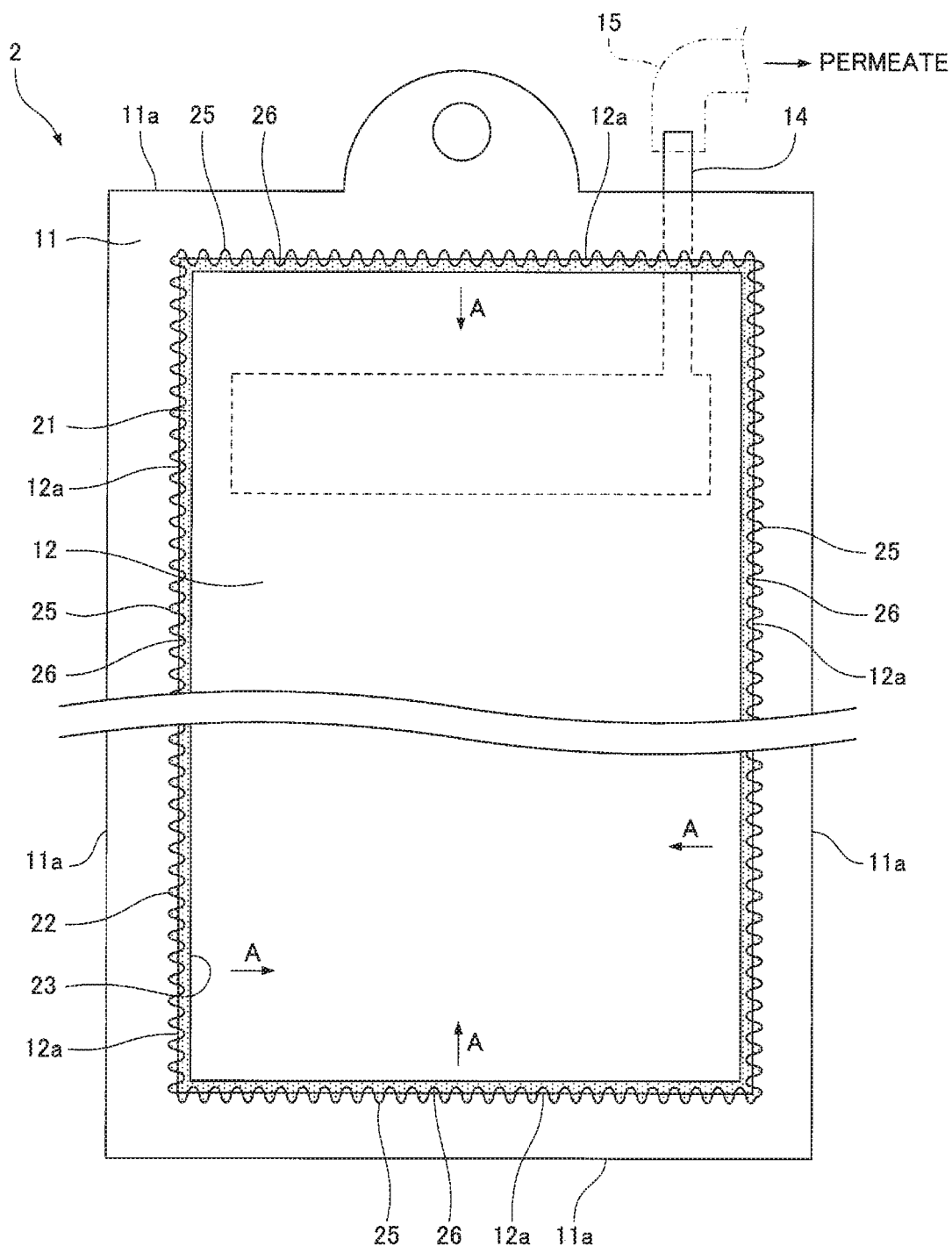
FIG. 2 is a front view of the flat membrane element.

As illustrated in FIGS. 1 and 2, the flat membrane element 2 includes a filter plate 11 made of a thermoplastic resin, e.g., ABS resin and sheet-type organic filtration membranes 12 bonded to the respective sides of the filter plate 11.

A permeate passage is formed between the filter plate 11 and the filtration membrane 12 and in the filter plate 11, and a permeate outlet 14 in communication with the permeate passage is provided on the upper end of the filter plate 11. Permeate having passed through the filtration membrane 12 is collected from the permeate outlet 14 through the permeate passage.

The flat membrane element 2 is in communication with a water collecting pipe 16 via a tube 15 connected to the permeate outlet 14. A permeate delivery pipe 17 for delivering permeate is connected to the water collecting pipe 16.

Figure 3:
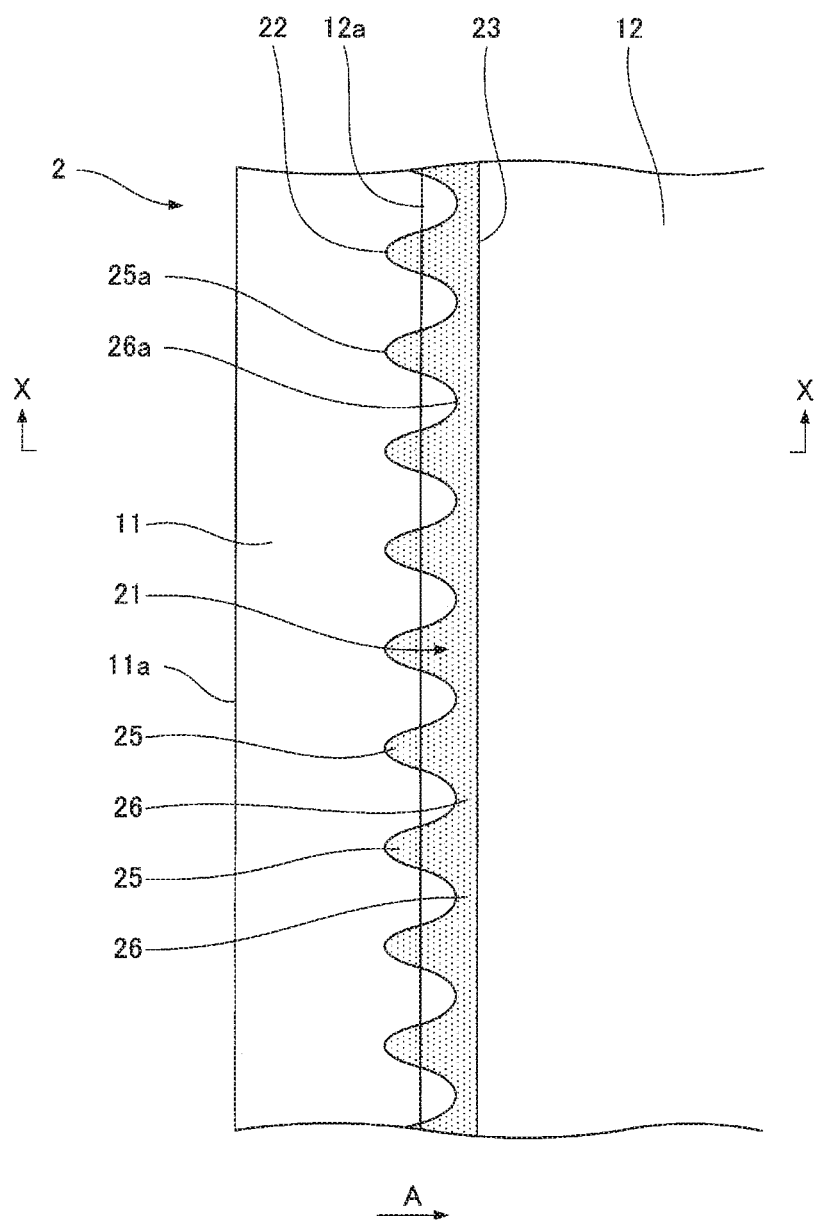
FIG. 3 is an enlarged front view of a first thermal welding part in the flat membrane element.
Figure 4:
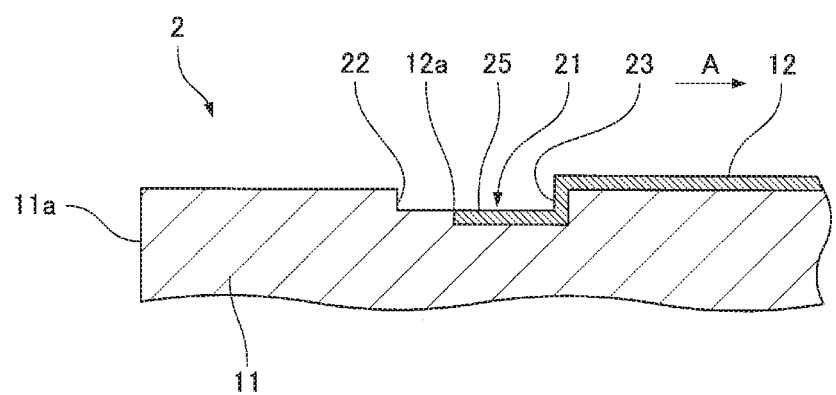
FIG. 4 is a cross-sectional view taken along line X-X of FIG. 3.
Figure 5:
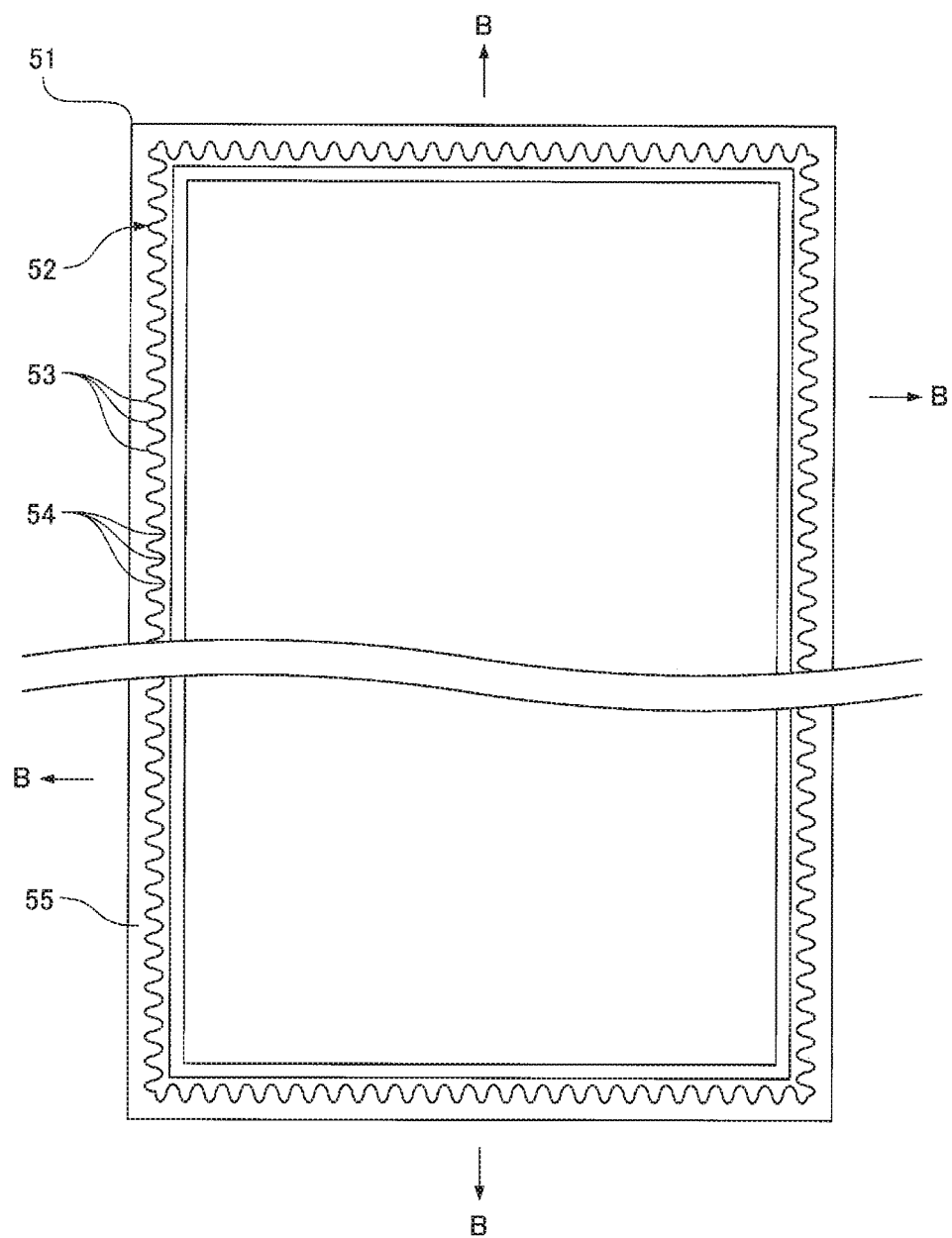
FIG. 5 is an overall view of a hot plate used when a filtration membrane in the flat membrane element is thermally welded to a filter plate.

As illustrated in FIGS. 2 to 4, the outer edge of the filtration membrane 12 is thermally welded over the circumference of the surface of the filter plate 11 by a first thermal welding part 21. This provides sealing between the filtration membrane 12 and the filter plate 11 along the outer edge of the filtration membrane 12. In the thermal welding part, at least one of the filtration membrane and the filter plate is pressed by a hot projection on a hot plate.

The first thermal welding part 21 includes an outer boundary line 22 disposed inside an outer edge 11a of the filter plate 11 and an inner boundary line 23 disposed inside the outer boundary line 22. Thermal welding is performed over an area between the outer boundary line 22 and the inner boundary line 23. The inner boundary line 23 is shaped like a straight line.

The outer boundary line 22 is wavy with a plurality of first projected portions 25 and a plurality of first recessed portions 26 that are alternately formed in a consecutive manner. The first projected portion 25 is shaped like an arc projecting toward the outer edge 11a of the filter plate 11 and is equivalent to a portion having a large welding area. The first recessed portion 26 is formed between the first projected portions 25, is U-shaped so as to retract in an inward direction A opposite to the outer edge 11a of the filter plate 11, and is equivalent to a portion having a small welding area.

An outer edge 12a of the filtration membrane 12 is disposed inside outer ends 25a of the first projected portions 25 and outside inner ends 26a of the first recessed portions 26. The first thermal welding part 21 is slightly lower than the surface of the filter plate 11 surrounding the first thermal welding part 21.

As illustrated in FIGS. 5 to 8, a hot plate 51 is used for thermally welding the outer edge of the filtration membrane 12 to the surface of the filter plate 11. The hot plate 51 includes a first hot projection 52. The first hot projection 52 is entirely shaped like a square (rectangular) loop and is wavy like the first thermal welding part 21. Specifically, the first hot projection 52 includes a plurality of projected portions 53 and recessed portions 54, which are wavy, and identical in shape to the first projected portions 25 and the first recessed portions 26 of the first thermal welding part 21, on the outer edge of the first hot projection 52.

A method for producing the flat membrane element 2 will be described below.

Figure 6:
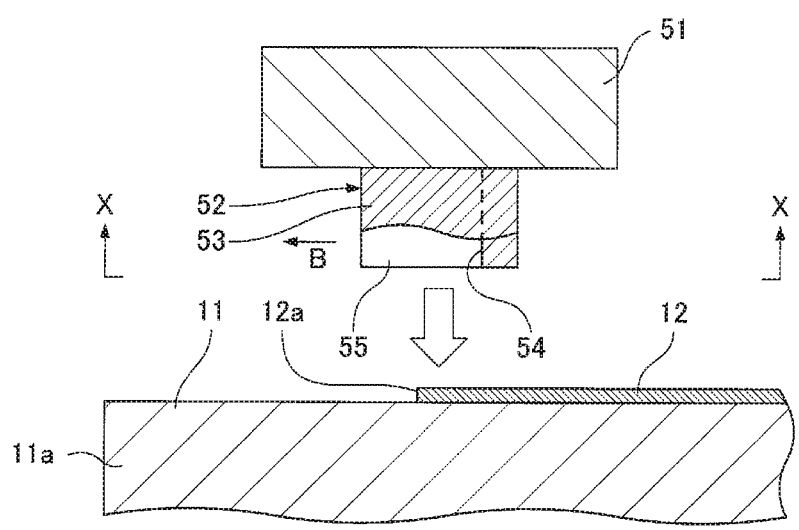
FIG. 6 illustrates a step of thermally welding the filtration membrane in the flat membrane element to the filter plate.
Figure 7:
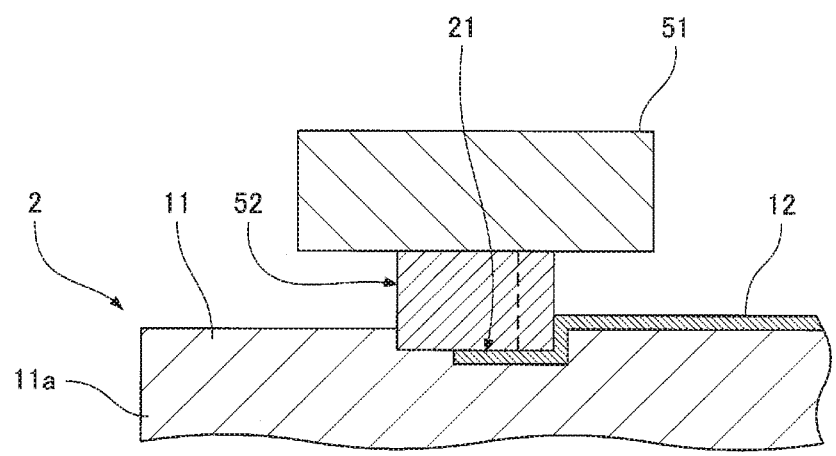
FIG. 7 illustrates a step of thermally welding the filtration membrane in the flat membrane element to the filter plate.

First, as illustrated in FIG. 6, the filtration membrane 12 is disposed on the surface of the filter plate 11. Subsequently, as illustrated in FIG. 7, the first hot projection 52 of the hot plate 51 is pressed to the filter plate 11 from above of the outer edge of the filtration membrane 12. Thus, the first thermal welding part 21 is formed and the outer edge of the filtration membrane 12 is thermally welded to the surface of the filter plate 11 in the first thermal welding part 21.

Thereafter, the hot plate 51 is lifted so as to remove the first hot projection 52 upward from the flat membrane element 2.

Figure 8:
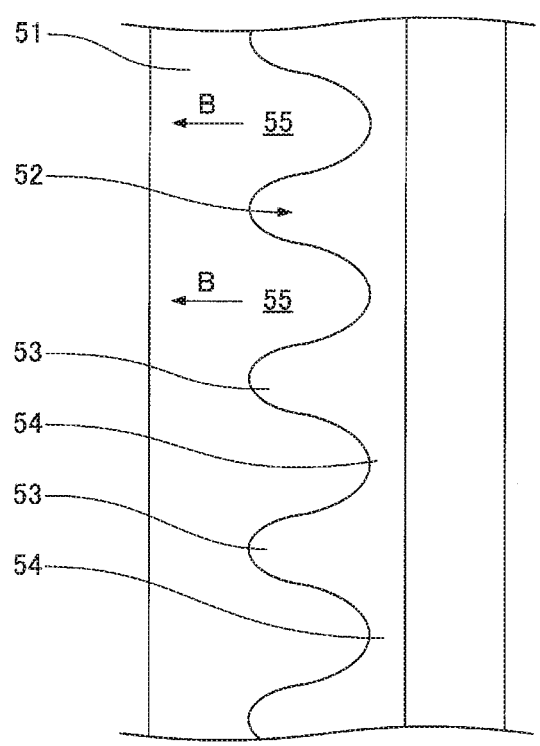
FIG. 8 is a cross-sectional view taken along line X-X of FIG. 6.

As illustrated in FIGS. 6 to 8, the first hot projection 52 is wavy like the first thermal welding part 21, unlike the mesh-type projection in the related art. Thus, recesses 55 formed on the hot plate 51 are not surrounded by the first hot projection 52, hardly leaving burnt bits. The first hot projection 52 is opened in an outward direction B. Thus, even if burnt bits stick to the projection, the hot plate 51 is cleaned so as to easily remove burnt bits, thereby preventing burnt bits from sticking to the flat membrane element 2 during thermal welding.

In the production of the flat membrane element 2, even if the filtration membrane 12 is displaced from the filter plate 11 or a production error appears in the dimensions of the filtration membrane 12, the first thermal welding part 21 provides firm sealing between the filter plate 11 and the filtration membrane 12 as long as the outer edge 12a of the filtration membrane 12 is disposed inside the outer ends 25a of the first projected portions 25 of the first thermal welding part 21 and outside the inner ends 26a of the first recessed portions 26 of the first thermal welding part 21 as illustrated in FIG. 3.

Figure 21:
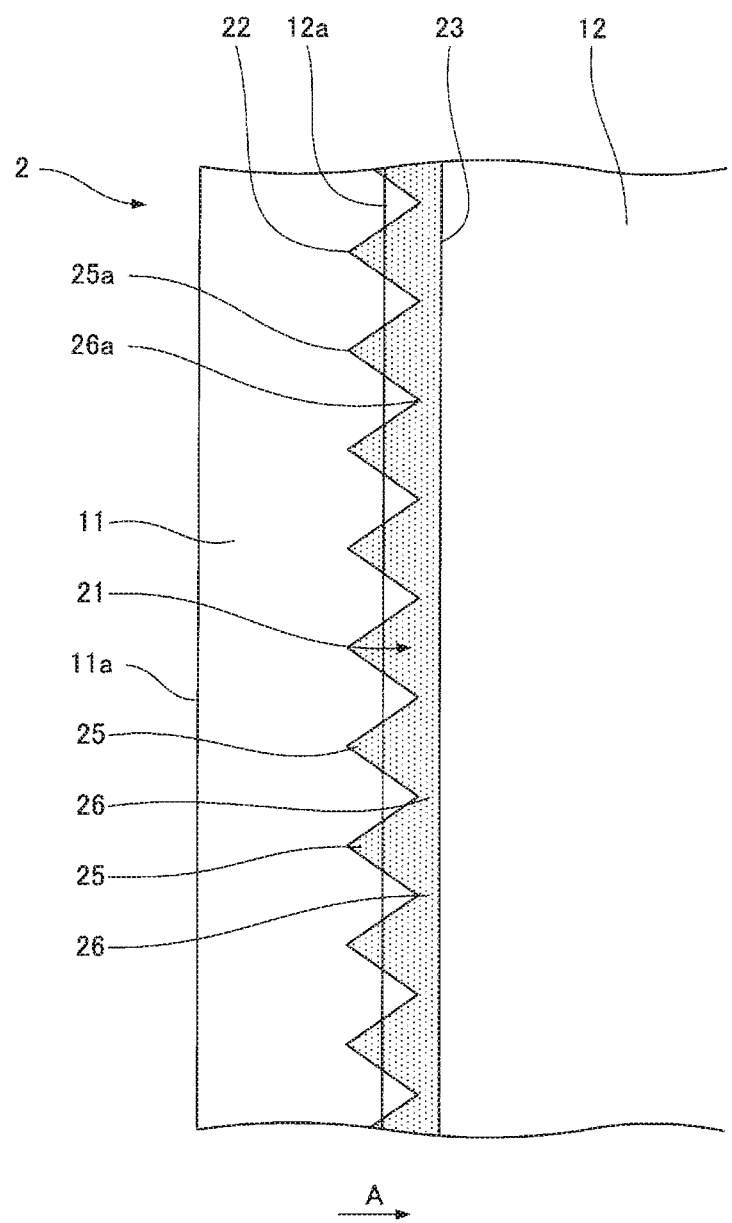
FIG. 21 is an enlarged front view of a first thermal welding part in a flat membrane element according to another embodiment of the present invention.
Figure 22:
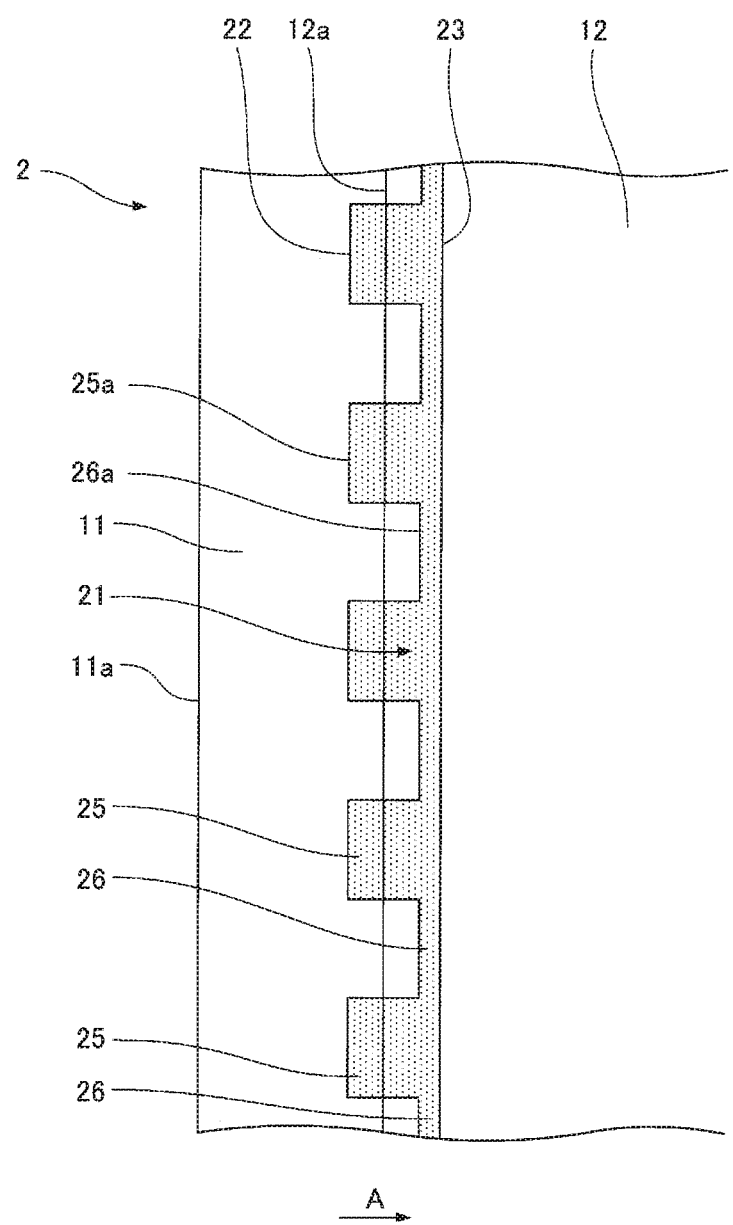
FIG. 22 is an enlarged front view of a first thermal welding part in a flat membrane element according to another embodiment of the present invention.
Figure 23:
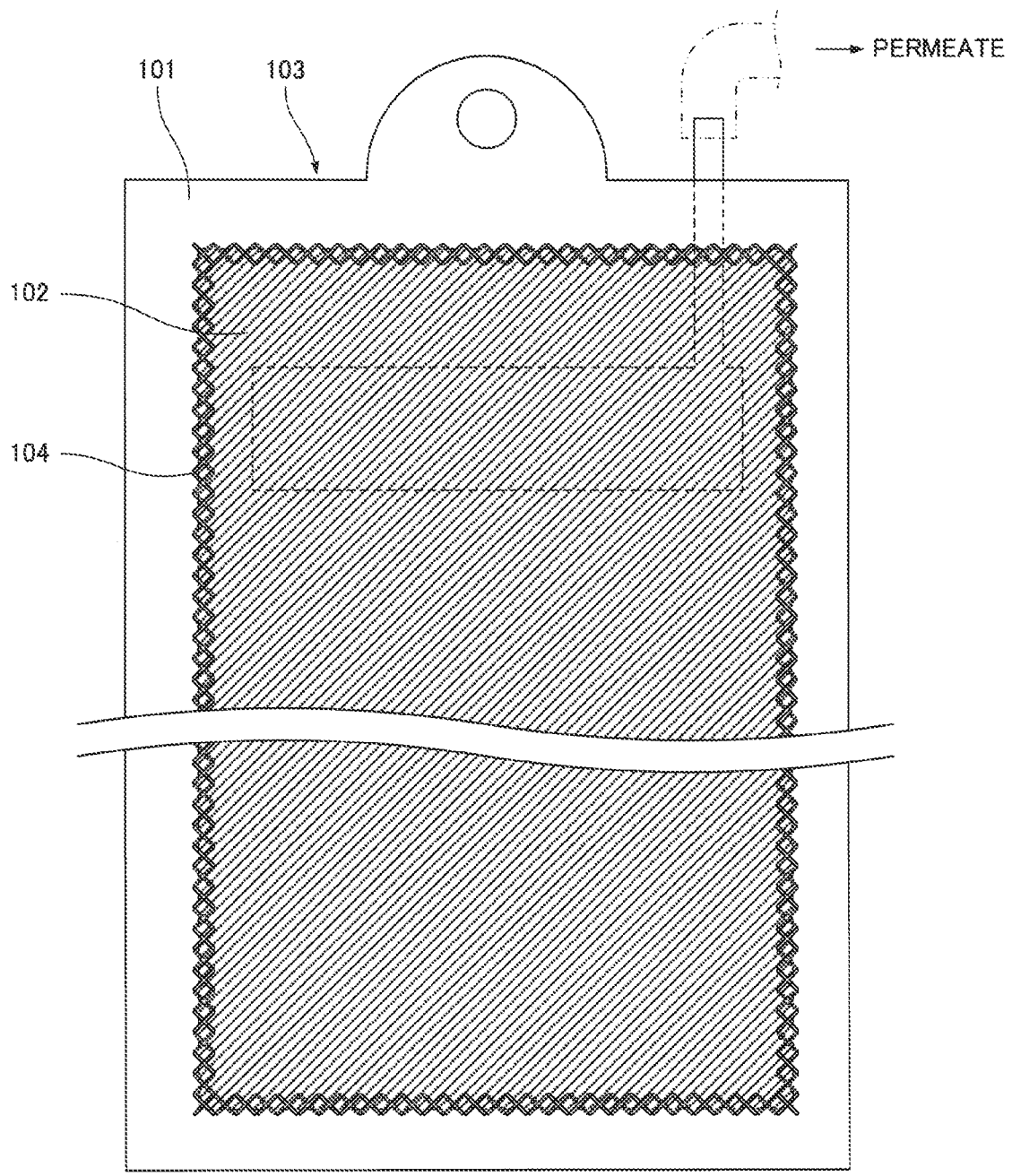
FIG. 23 is a front view of a flat membrane element of the related art.
Figure 24:
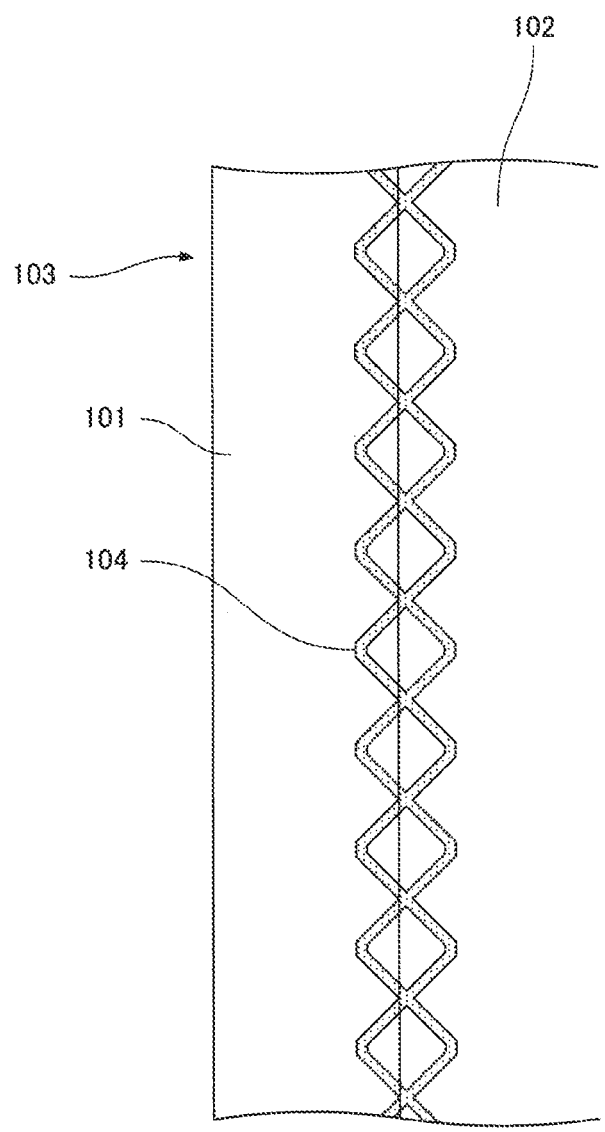
FIG. 24 is an enlarged front view of a thermal welding part in the flat membrane element.
Figure 25:
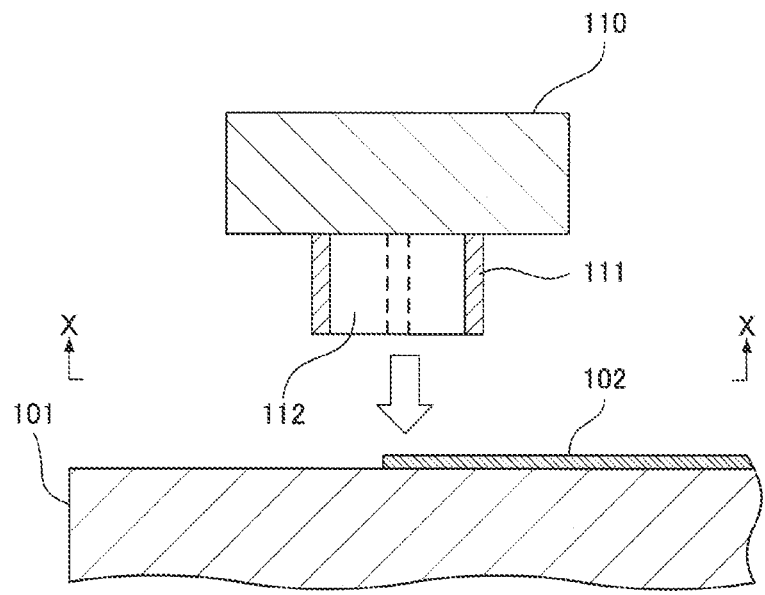
FIG. 25 illustrates a step of thermally welding a filtration membrane in the flat membrane element to a filter plate.
Figure 26:
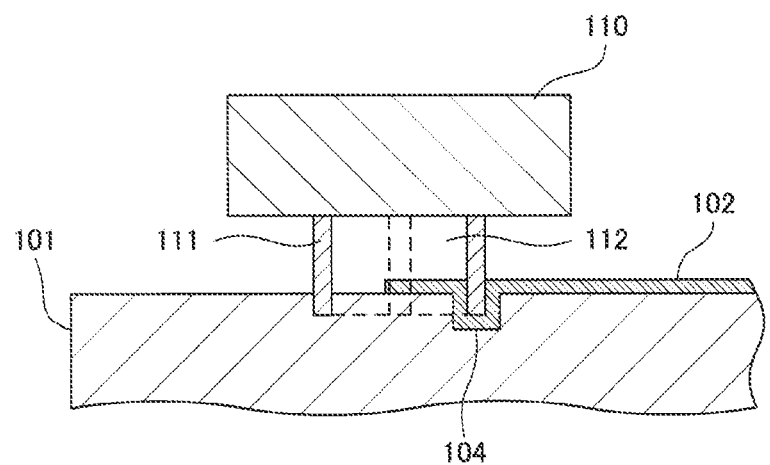
FIG. 26 illustrates a step of thermally welding the filtration membrane in the flat membrane element to the filter plate.
Figure 27:
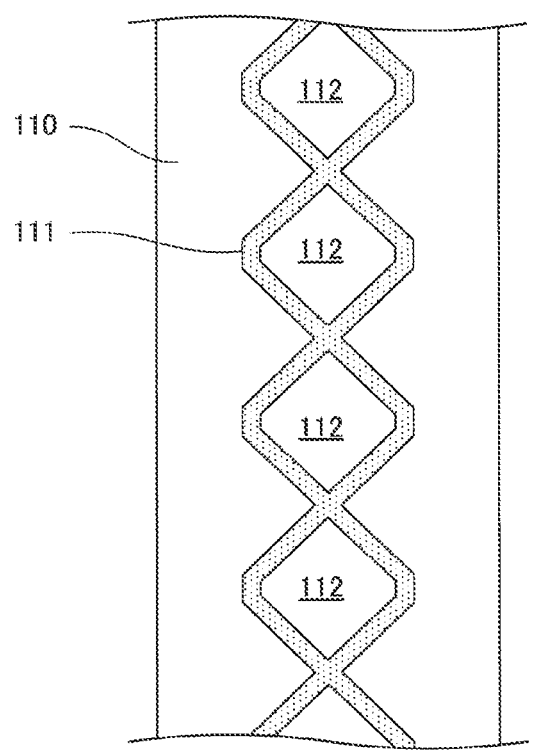
FIG. 27 is a cross-sectional view taken along line X-X of FIG. 25.

In the present embodiment, the outer boundary line 22 has, but is not limited to, a wavy shape of curves. The outer boundary line 22 may be formed in a zigzag pattern of straight lines (see FIG. 21) or a pattern of rectangular projections and recesses (see FIG. 22).

Second Embodiment

Figure 9:
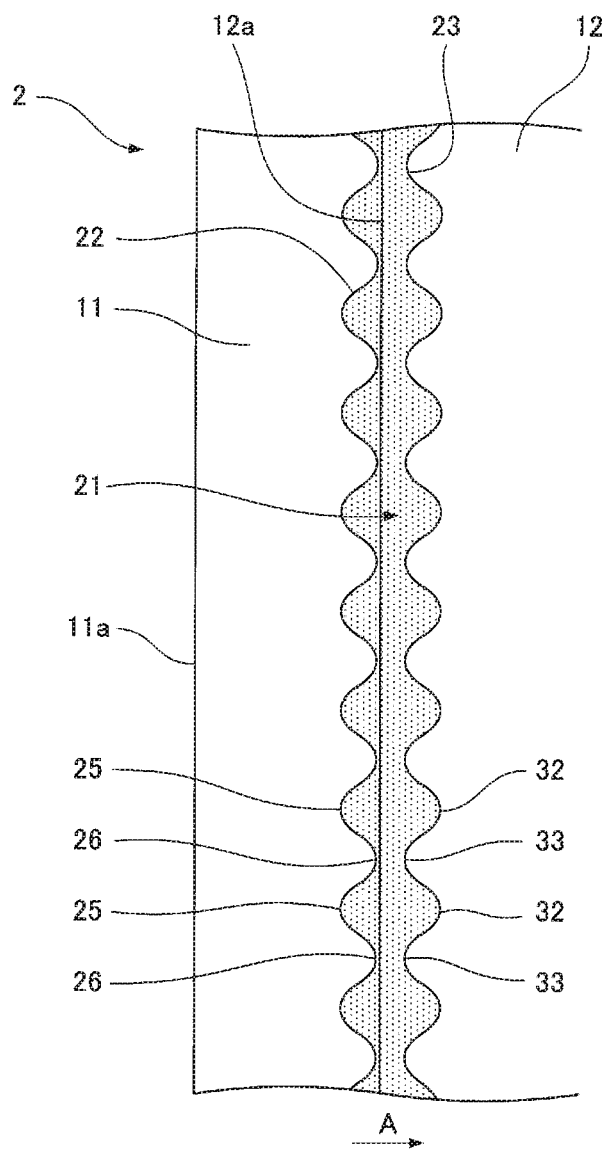
FIG. 9 is an enlarged front view of a first thermal welding part in a flat membrane element according to a second embodiment of the present invention.

In a second embodiment, as illustrated in FIG. 9, an inner boundary line 23 of a first thermal welding part 21 is formed in a wavy pattern where a plurality of second projected portions 32 and a plurality of second recessed portions 33 are alternately formed. The second projected portion 32 is shaped like an arc projecting in an inward direction A opposite to an outer edge 11a of a filter plate 11. The second recessed portion 33 is formed between the second projected portions 32 and is U-shaped so as to retract toward the outer edge 11a of the filter plate 11.

Figure 10:
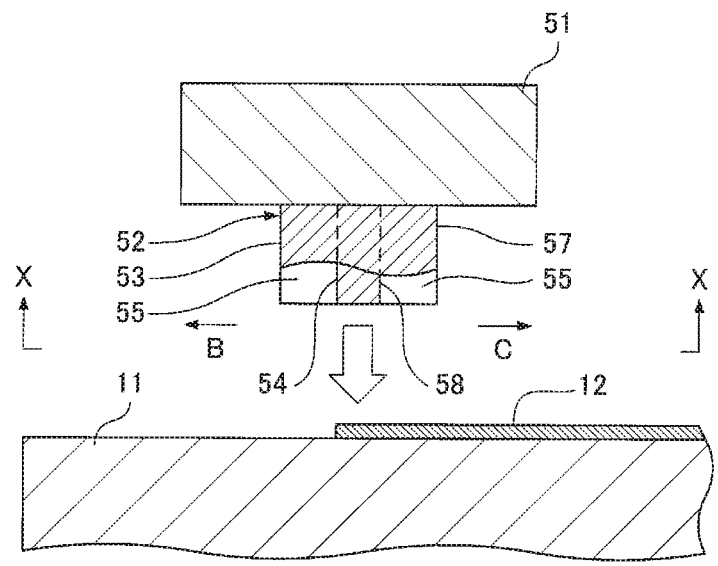
FIG. 10 illustrates a step of thermally welding a filtration membrane in the flat membrane element to a filter plate.
Figure 11:
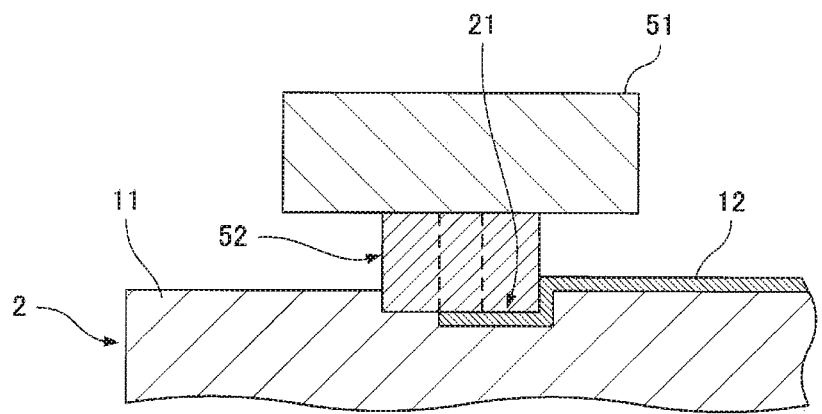
FIG. 11 illustrates a step of thermally welding the filtration membrane in the flat membrane element to the filter plate.
Figure 12:
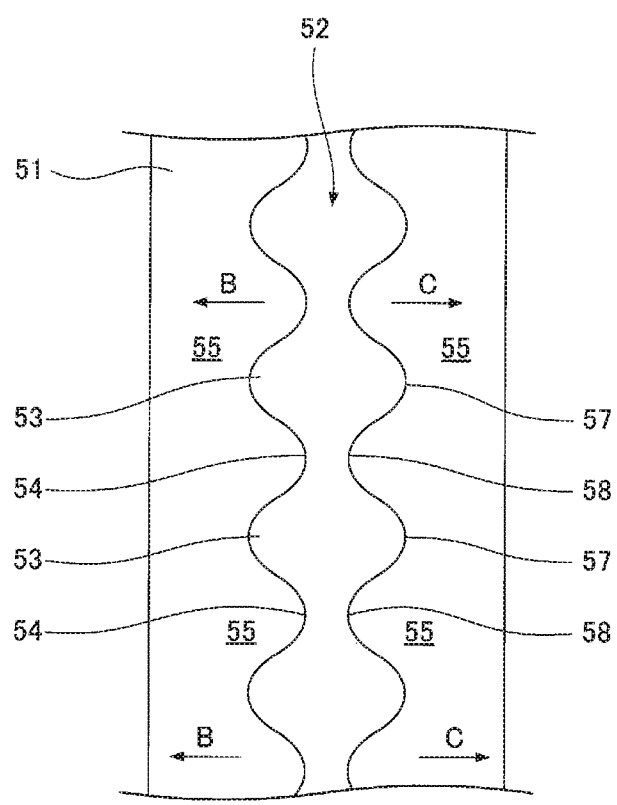
FIG. 12 is a cross-sectional view taken along line X-X of FIG. 10.

As illustrated in FIGS. 10 to 12, a first hot projection 52 of a hot plate 51 is entirely shaped like a square (rectangular) loop and is wavy like the first thermal welding part 21. Specifically, the first hot projection 52 includes a plurality of wavy projected portions 53 and recessed portions 54 on the outer edge of the first hot projection 52 and a plurality of wavy projected portions 57 and recessed portions 58 on the inner edge of the first hot projection 52.

In this configuration, the first hot projection 52 is wavy like the first thermal welding part 21, unlike the mesh-type projection in the related art. Thus, recesses 55 formed on the hot plate 51 are not surrounded by the first hot projection 52, hardly leaving burnt bits. The first hot projection 52 is opened in an outward direction B and an inward direction C. Thus, even if burnt bits stick to the projection, the hot plate 51 is cleaned so as to easily remove burnt bits, thereby preventing burnt bits from sticking to a flat membrane element 2 during thermal welding.

Third Embodiment

Figure 13:
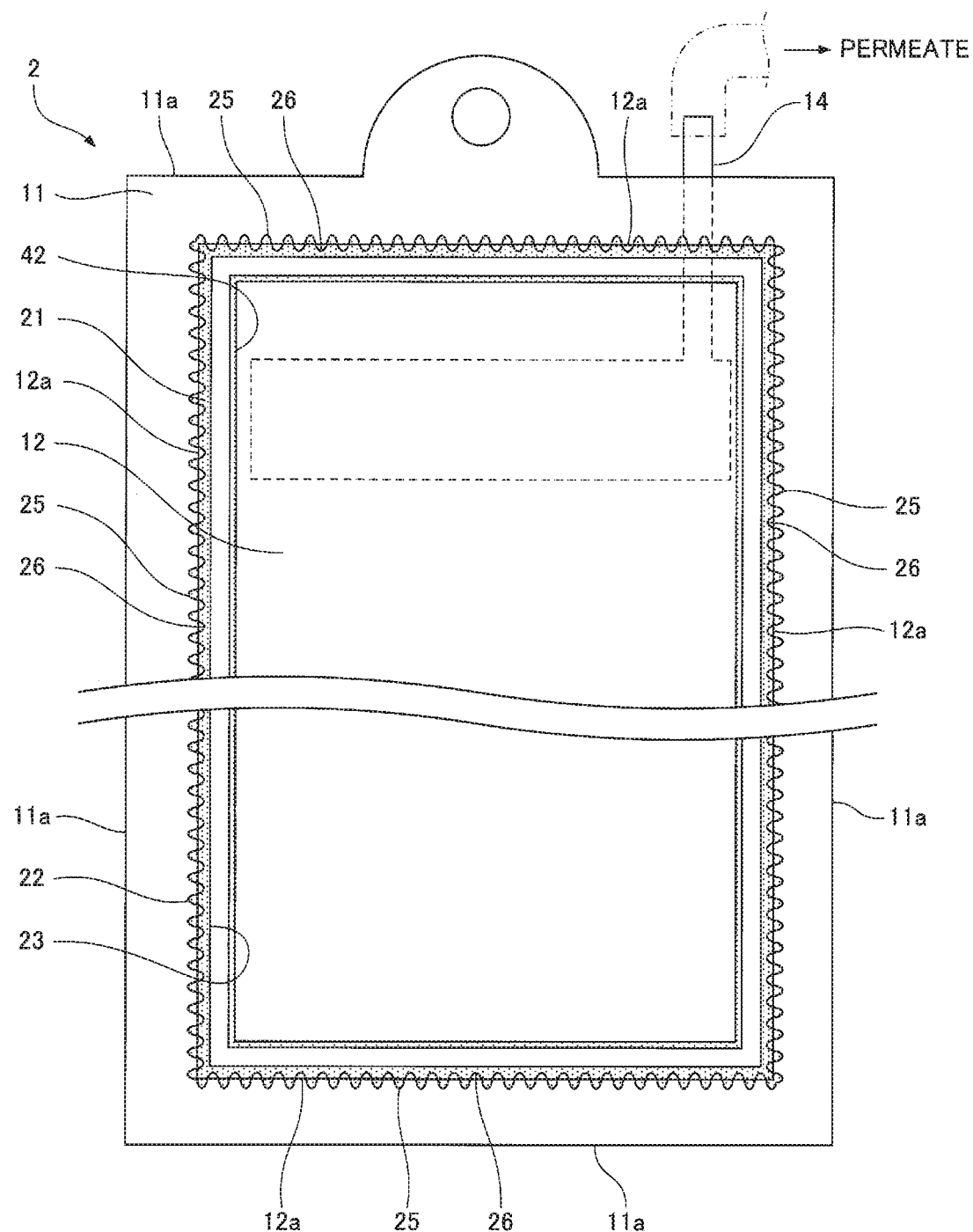
FIG. 13 is a front view of a flat membrane element according to a third embodiment of the present invention.
Figure 14:
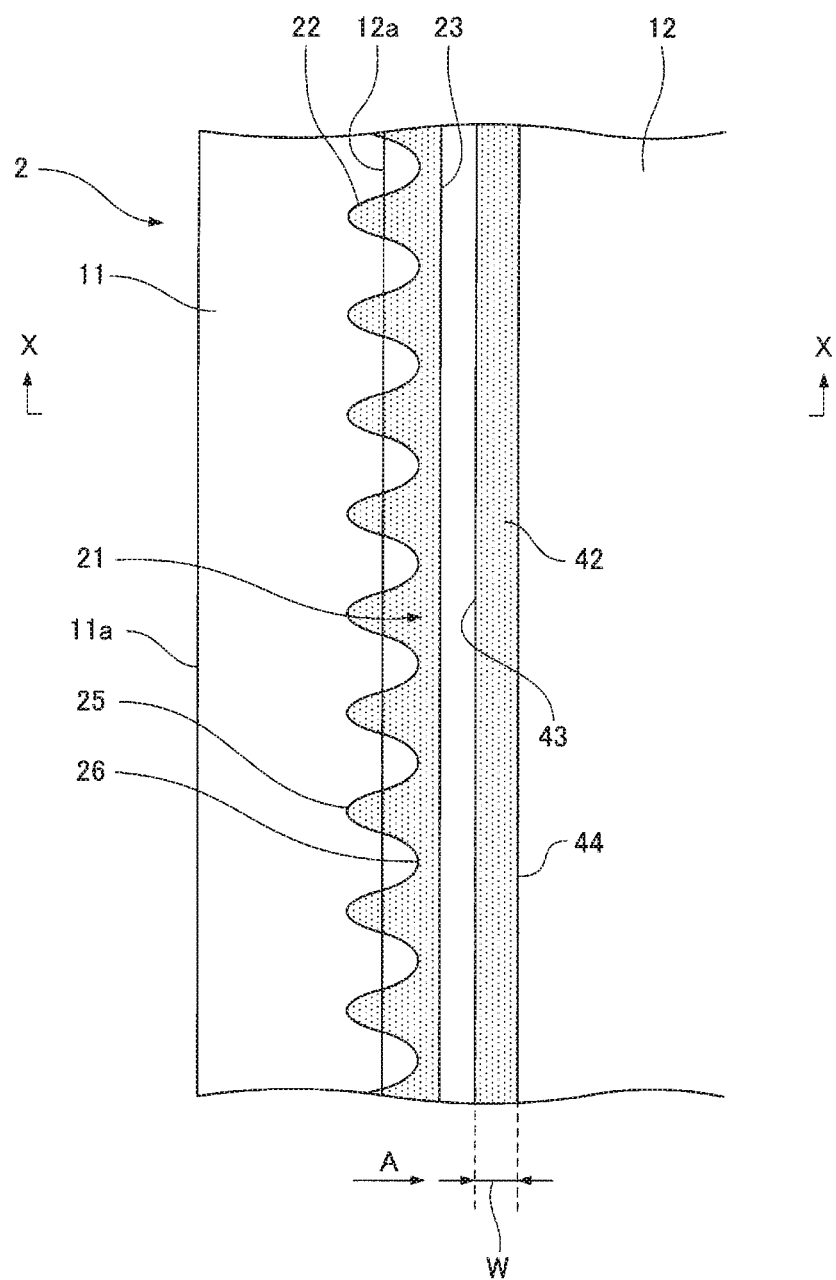
FIG. 14 is an enlarged front view of a first thermal welding part and a second thermal welding part in the flat membrane element.
Figure 15:
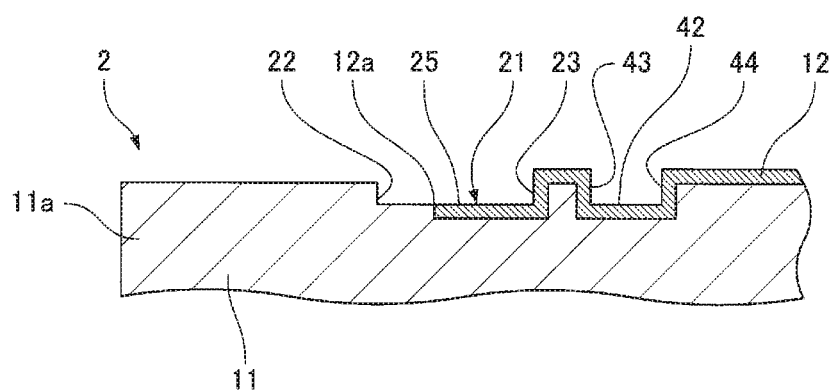
FIG. 15 is a cross-sectional view taken along line X-X of FIG. 14.
Figure 16:
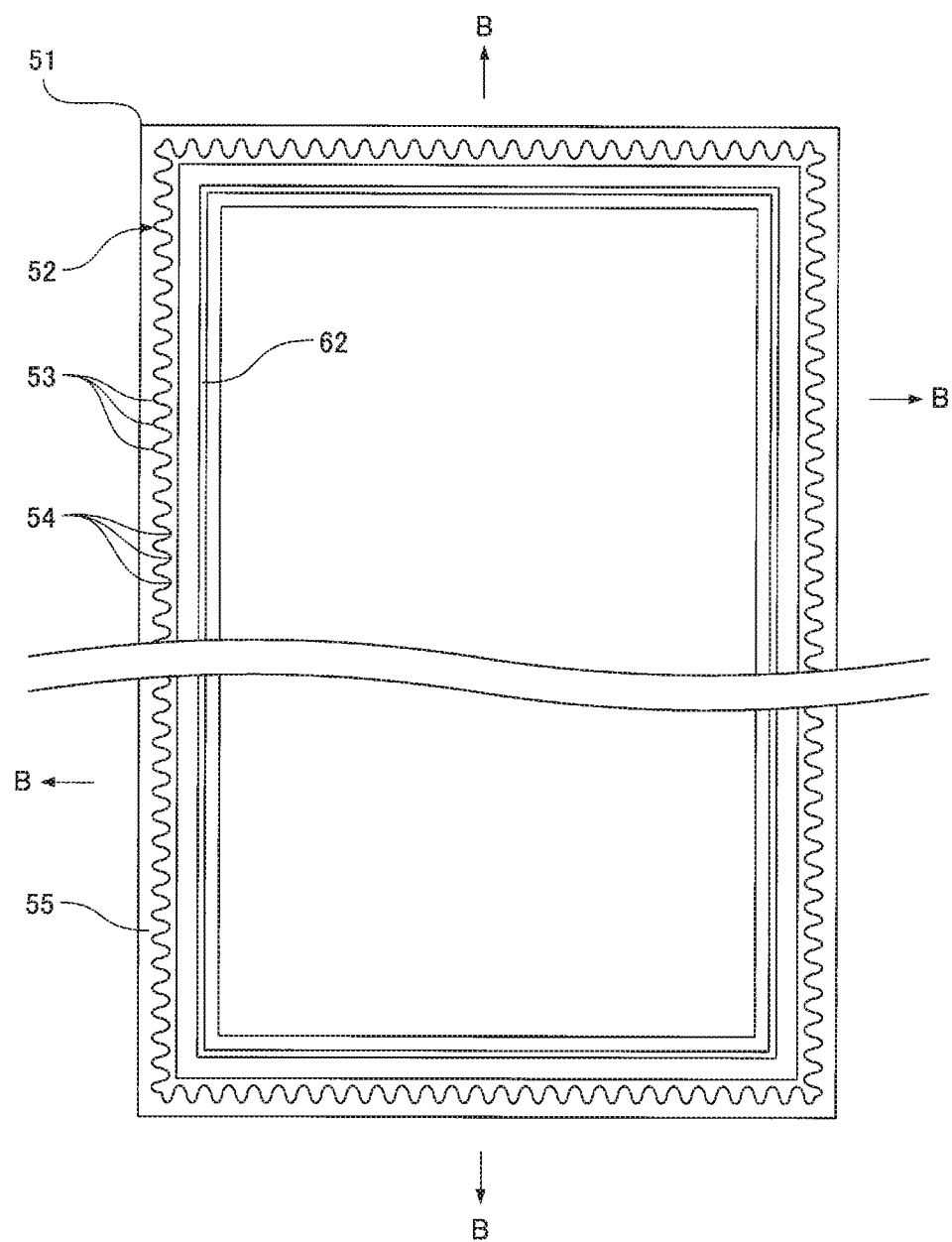
FIG. 16 is an overall view of a hot plate used when a filtration membrane in the flat membrane element is thermally welded to a filter plate.

In a third embodiment, as illustrated in FIGS. 13 to 15, the outer edge of a filtration membrane 12 is thermally welded to the surface of a filter plate 11 by a first thermal welding part 21 and a second thermal welding part 42 that is different from the first thermal welding part 21. The first thermal welding part 21 is disposed between the second thermal welding part 42 and an outer edge 11a of the filter plate 11.

The second thermal welding part 42 is shaped like a straight line having a predetermined width W and is disposed inside the first thermal welding part 21. An outer boundary line 43 and an inner boundary line 44 of the second thermal welding part 42 are straight lines that are parallel with each other.

With this configuration, the outer edge of the filtration membrane 12 is thermally welded to the surface of the filter plate 11 by the first thermal welding part 21 and the second thermal welding part 42. This can more reliably prevent the outer edge of the filtration membrane 12 from peeling from the surface of the filter plate 11.

As illustrated in FIGS. 16 to 19, a hot plate 51 includes a first hot projection 52 for forming the first thermal welding part 21 and a second hot projection 62 (an example of another hot projection) for forming the second thermal welding part 42. The first hot projection 52 and the second hot projection 62 are entirely shaped like square (rectangular) loops. The second hot projection 62 is identical in shape to the second thermal welding part 42, that is, the second hot projection 62 is linearly formed with the predetermined width W.

A method for producing the flat membrane element 2 will be described below.

Figure 17:
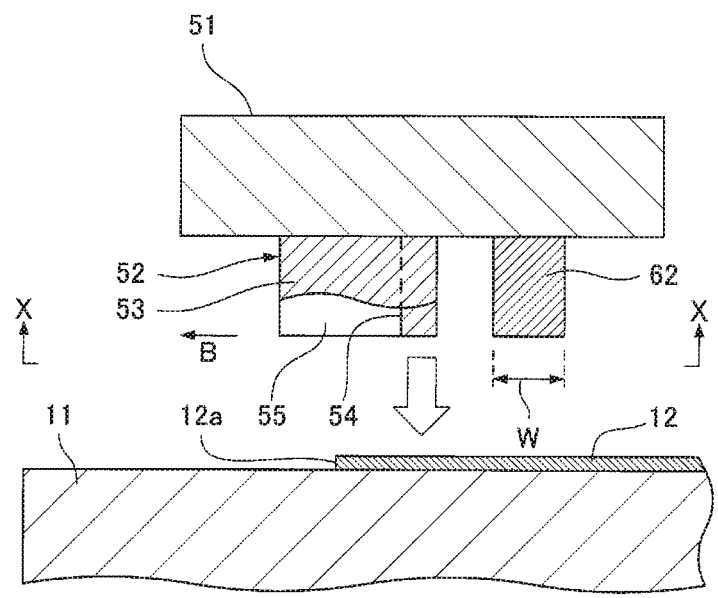
FIG. 17 illustrates a step of thermally welding the filtration membrane in the flat membrane element to the filter plate.
Figure 18:
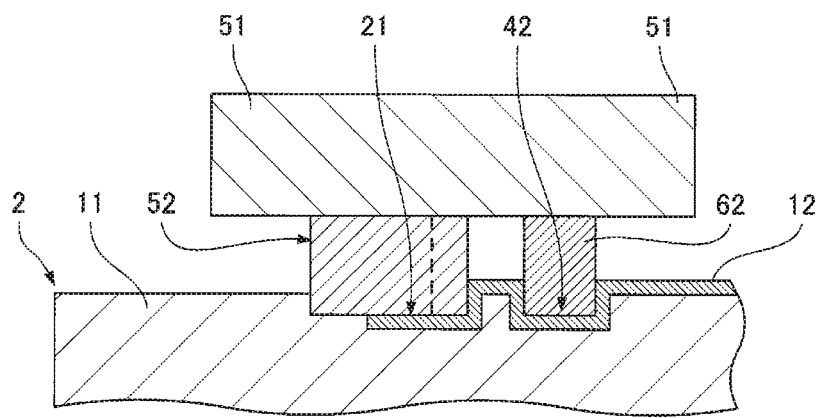
FIG. 18 illustrates a step of thermally welding the filtration membrane in the flat membrane element to the filter plate.
Figure 19:
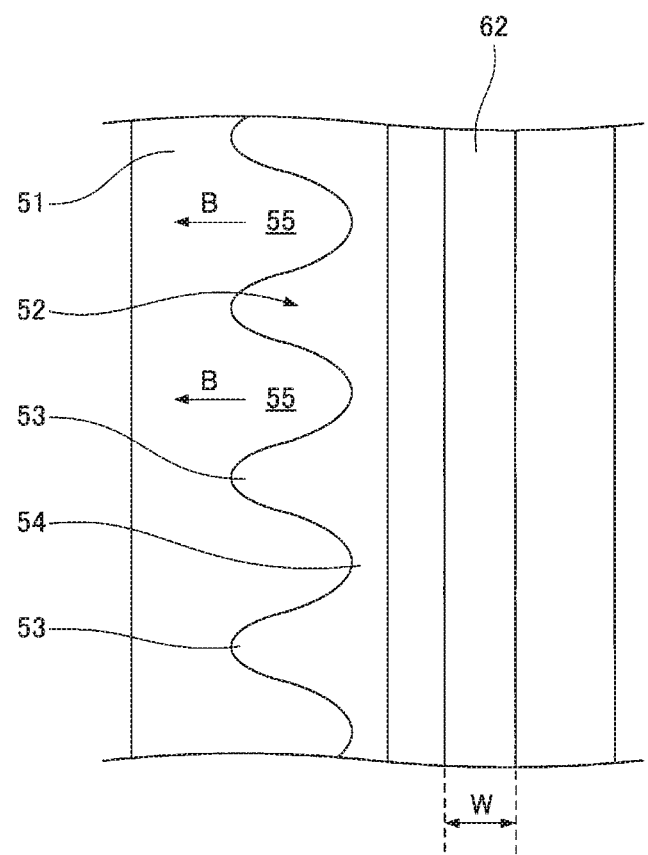
FIG. 19 is a cross-sectional view taken along line X-X of FIG. 17.

First, as illustrated in FIG. 17, the filtration membrane 12 is disposed on the surface of the filter plate 11. Subsequently, as illustrated in FIG. 18, the first hot projection 52 and the second hot projection 62 of the hot plate 51 are pressed to the filter plate 11 from above of the outer edge of the filtration membrane 12. Thus, the first thermal welding part 21 and the second thermal welding part 42 are formed and the outer edge of the filtration membrane 12 is thermally welded to the surface of the filter plate 11 in the first thermal welding part 21 and the second thermal welding part 42.

Thereafter, the hot plate 51 is lifted so as to remove the first hot projection 52 and the second hot projection 62 upward from the flat membrane element 2.

This configuration can achieve the same operations and effects as in the first embodiment.

In the third embodiment, as illustrated in FIG. 13, the single second thermal welding part 42 is provided. Multiple second thermal welding parts 42 may be provided.

Figure 20:
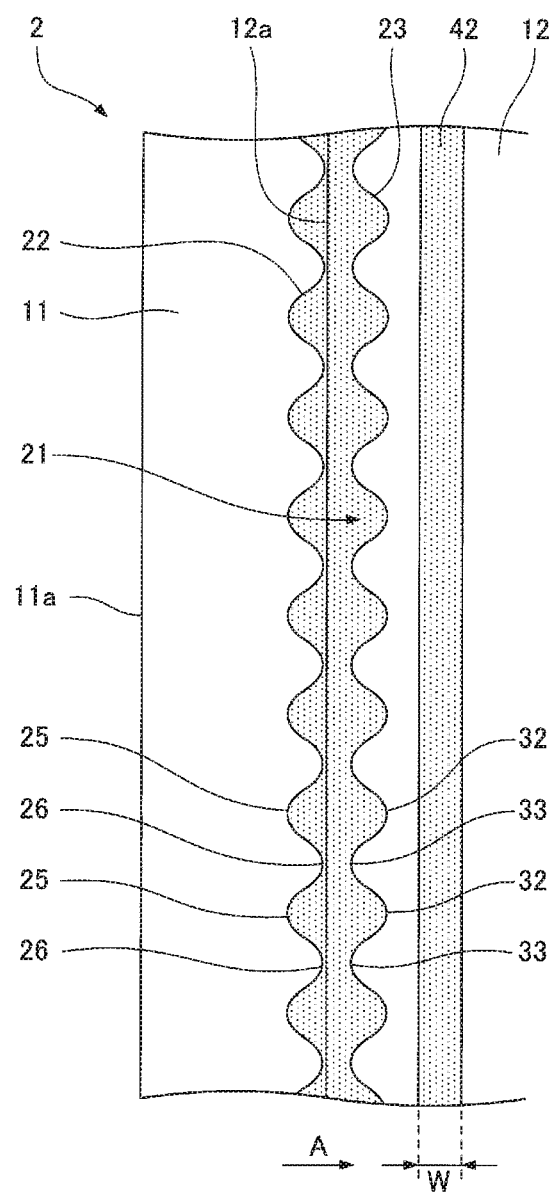
FIG. 20 is an enlarged front view of a first thermal welding part and a second thermal welding part in a flat membrane element according to a fourth embodiment of the present invention.

As a fourth embodiment, as illustrated in FIG. 20, a second thermal welding part 42 may be provided inside the first thermal welding part 21 described in the second embodiment.

What is claimed is:

1. A flat membrane element comprising a sheet-type filtration membrane bonded to a surface of a filter plate made of thermoplastic resin,
    the flat membrane element including a thermal welding part in which an outer edge of the filtration membrane is bonded to the surface of the filter plate by thermal welding,
    wherein the thermal welding part is formed over an entire area between an outer boundary line inside an outer edge of the filter plate and an inner boundary line inside the outer boundary line,
    the outer boundary line has a plurality of projected portions and recessed portions that are alternately formed in a consecutive manner,
    the projected portions project toward the outer edge of the filter plate,
    the recessed portions are formed between the projected portions and retract in an inward direction opposite to the outer edge of the filter plate, and
    wherein the outer edge of the filtration membrane is disposed inside an outer end of the projected portions of the thermal welding part and outside an inner end of the recessed portions of the thermal welding part.

2. The flat membrane element according to claim 1, wherein the outer boundary line is wavy.

3. The flat membrane element according to claim 1, wherein the inner boundary line has a plurality of projected portions and recessed portions that are alternately formed in a consecutive manner,
    the projected portions of the inner boundary line project in the inward direction opposite to the outer edge of the filter plate, and
    the recessed portions of the inner boundary line are formed between the projected portions of the inner boundary line and retract toward the outer edge of the filter plate.

4. The flat membrane element according to claim 1, wherein the inner boundary line is wavy.

5. The flat membrane element according to claim 1, wherein the inner boundary line is a straight line.

6. The flat membrane element according to claim 1, wherein the outer edge of the filtration membrane is thermally welded to the surface of the filter plate by a first thermal welding part thermally welded to the surface of the filter plate and a second thermal welding part that is different from the first thermal welding part, and
    the first thermal welding part is disposed between the second thermal welding part and the outer edge of the filter plate.

7. The flat membrane element according to claim 6, wherein an outer boundary line and an inner boundary line of the second thermal welding part are straight lines that are parallel with each other.

8. The flat membrane element according to claim 1, wherein the entire area between the outer boundary line inside the outer edge of the filter plate and the inner boundary line inside the outer boundary line over which the thermal welding part is formed is continuous between the outer boundary line inside the outer edge of the filter plate and the inner boundary line inside the outer boundary line.

9. A method for producing a flat membrane element including a thermal welding part in which an outer edge of a sheet-type filtration membrane is bonded to a surface of a filter plate made of thermoplastic resin by thermal welding part,
    the method comprising:
    forming the thermal welding part over an entire area between an outer boundary line inside an outer edge of the filter plate and an inner boundary line inside the outer boundary line by pressing the outer edge of the filtration membrane with a hot projection of a hot plate in a state in which the filtration membrane is disposed on the surface of the filter plate to bond the filtration membrane to the filter plate,
    wherein the outer boundary line has a plurality of projected portions and recessed portions that are alternately formed in a consecutive manner,
    the projected portions project toward the outer edge of the filter plate while the recessed portions are formed between the projected portions and retract in an inward direction opposite to the outer edge of the filter plate and the filtration membrane is bonded to the filter plate while the outer edge of the filtration membrane is disposed inside an outer end of the projected portions of the thermal welding part and outside an inner end of the recessed portions of the thermal welding part.

10. The method for producing a flat membrane element according to claim 9, wherein the inner boundary line of the thermal welding part is linearly formed.

11. The method for producing a flat membrane element according to claim 9, wherein the hot projection is entirely shaped like a rectangular loop.

12. The method for producing a flat membrane element according to claim 9, wherein the outer edge of the filtration membrane is pressed by a first hot projection and a second hot projection of the hot plate so as to form a first thermal welding part and a second thermal welding part that is different from the first thermal welding part, and the filtration membrane is bonded to the filter plate while the first thermal welding part is disposed between the second thermal welding part and the outer edge of the filter plate.

13. The method for producing a flat membrane element according to claim 12, wherein each of the first hot projection and the second hot projection is entirely shaped like a rectangular loop.

* * * * *